(12) United States Patent
Idrisov et al.

(10) Patent No.: US 10,514,994 B2
(45) Date of Patent: Dec. 24, 2019

(54) DISTRIBUTED SCALABLE WORKLOAD TESTING

(71) Applicant: Machine Zone, Inc., Palo Alto, CA (US)

(72) Inventors: Renat Idrisov, Berlin (DE); Timofey Barmin, Sunnyvale, CA (US)

(73) Assignee: SATORI WORLDWIDE, LLC, Palo Alto, CA (US)

( * ) Notice: Subject to any disclaimer, the term of this patent is extended or adjusted under 35 U.S.C. 154(b) by 0 days.

(21) Appl. No.: 15/481,979

(22) Filed: Apr. 7, 2017

(65) Prior Publication Data

US 2017/0212822 A1    Jul. 27, 2017

Related U.S. Application Data

(63) Continuation-in-part of application No. 15/176,871, filed on Jun. 8, 2016.
(Continued)

(51) Int. Cl.
*G06F 11/34* (2006.01)
*G06F 9/50* (2006.01)
(Continued)

(52) U.S. Cl.
CPC ........ *G06F 11/3433* (2013.01); *G06F 9/5061* (2013.01); *G06F 9/5072* (2013.01);
(Continued)

(58) Field of Classification Search
CPC .. G06F 11/2205; G06F 11/2273; G06F 11/26; G06F 11/3003; G06F 11/3495; G06F 2209/5011; G06F 9/5061; G06F 9/5072
(Continued)

(56) References Cited

U.S. PATENT DOCUMENTS

| | | | |
|---|---|---|---|
| 8,209,702 B1 | 6/2012 | Roytman et al. | |
| 8,763,001 B2 * | 6/2014 | Ghosh | G06F 9/5083 |
| | | | 718/104 |

(Continued)

FOREIGN PATENT DOCUMENTS

| | | |
|---|---|---|
| EP | 2447838 A1 | 5/2012 |
| EP | 2447838 A1 | 5/2012 |

OTHER PUBLICATIONS

Notification of Transmittal of the International Search Report and the Written Opinion of the International Searching Authority, or the Declaration (Form ISA/220) for International Application No. PCT/US2016/036425 dated Aug. 23, 2016 (11 pages).
(Continued)

*Primary Examiner* — John H Le
(74) *Attorney, Agent, or Firm* — Womble Bond Dickinson (US) LLP; Daniel E. Ovanezian

(57) ABSTRACT

Methods, systems, and apparatus, including computer programs encoded on a computer storage medium, are described for: allocating a first pool of workers on a plurality of nodes, wherein each node comprises one or more of the workers from the first pool; providing a first set of instructions to the first pool of workers for performing a first task configured to interact with a computer system; activating the first pool of workers to perform the first task; updating at least a portion of the first set of instructions for a subset of the first pool of workers while the workers are performing the first task; and monitoring at least one performance metric associated with the computer system while the workers from the subset of the first pool are performing the first task.

20 Claims, 7 Drawing Sheets

Related U.S. Application Data

(60) Provisional application No. 62/173,251, filed on Jun. 9, 2015.

(51) Int. Cl.
*G06F 11/30* (2006.01)
*G06F 9/48* (2006.01)

(52) U.S. Cl.
CPC ...... *G06F 11/3006* (2013.01); *G06F 11/3414* (2013.01); *G06F 11/3452* (2013.01); *G06F 11/3082* (2013.01); *G06F 11/3428* (2013.01); *G06F 2201/88* (2013.01); *G06F 2209/5011* (2013.01)

(58) Field of Classification Search
USPC ........ 702/119, 120, 123, 182, 186; 709/220, 709/221, 224; 714/11, 25, 32; 718/104
See application file for complete search history.

(56) References Cited

U.S. PATENT DOCUMENTS

| | | |
|---|---|---|
| 8,839,035 B1 | 9/2014 | Dimitrovich et al. |
| 8,977,903 B1 | 3/2015 | Chandrasekharapuram et al. |
| 2004/0111720 A1 | 6/2004 | Vertes |
| 2014/0047272 A1 | 2/2014 | Breternitz et al. |
| 2014/0108861 A1* | 4/2014 | Abadi ............... G06F 9/5066 714/11 |
| 2014/0351412 A1 | 11/2014 | Elisha |
| 2016/0364307 A1 | 12/2016 | Garg et al. |

OTHER PUBLICATIONS

Int'l Search Report and Written Opinion of the ISA/EP in PCT/US2018/025210 dated Jul. 6, 2018; 12 pgs.

U.S. Appl. No. 15/176,871, filed Jun. 8, 2016, Distributed Scalable Workload Testing, Idrisov et al.

* cited by examiner

DISTRIBUTED SCALABLE WORKLOAD TESTING

CROSS-REFERENCE TO RELATED APPLICATIONS

This application is a continuation-in-part of U.S. application Ser. No. 15/176,871, filed Jun. 8, 2016, which claims the benefit of U.S. Provisional Application No. 62/173,251, filed Jun. 9, 2015, the entire contents of each of which are hereby incorporated by reference.

BACKGROUND

Computer systems and associated services face ever-increasing demands from users for higher performance and reliability. Testing such services before and after implementation is important to ensure the services are working properly and can keep up with user demands.

Existing tools for testing computer systems are generally inflexible, difficult to scale, and provide no cloud support. Such tools typically attempt to determine how many concurrent users a system can handle. A problem with this approach, however, is that it assumes each user (represented by a connection) executes a single request and waits for a response before executing the next request (e.g., a closed feedback loop that executes a single request per connection). Such an assumption is often not valid for web applications. For instance, different users may initiate different types of actions, and those actions may spawn multiple requests which may have different weights. Furthermore, with a synchronous request response cycle, changes in response time can change with the number of requests that are sent to the system being tested (i.e., the system under test, or "SUT").

SUMMARY

Implementations of the subject matter described in this specification relate to systems and methods for distributed workload testing. A benchmark system described herein can execute test scenarios (e.g., with various load profiles) written by a user, and generate workload (also referred to herein as "load") from multiple nodes that apply to a system under test (SUT). The benchmark system can generate workload that is scalable to millions of requests per second and/or can be generated from nodes distributed over multiple data centers. The benchmark system may coordinate among the nodes such that the nodes act as a single unit for the user. The benchmark system may be used monitor and/or collect metrics (e.g., counters and/or histograms) associated with the performance of the SUT during the test. Reports and various charts may be automatically generated based on the performance metrics. The benchmark system provides a rapid development environment and provides one-step testing deployment and execution.

In one aspect, the subject matter described herein relates to a method of testing a computer system. The method includes using one or more computer processors to perform the following steps: allocating a first pool of workers on a plurality of nodes, wherein each node comprises one or more of the workers from the first pool; providing a first set of instructions to the first pool of workers for performing a first task configured to interact with a computer system; activating the first pool of workers to perform the first task; updating at least a portion of the first set of instructions for a subset of the first pool of workers while the workers are performing the first task; and monitoring at least one performance metric associated with the computer system while the workers from the subset of the first pool are performing the first task.

In certain examples, each node in the plurality of nodes is or includes a virtual machine and/or a physical machine. In some instances, each worker from the first pool resides on a separate node. The plurality of nodes may include at least one director node and at least one worker node. The at least one performance metric may be or include, for example, speed and/or latency. The method may include providing the at least one performance metric to a client device of a user. The method may include providing a worker module configured to act as an interface between the first pool of workers and the computer system.

In some examples, the method can include: allocating a second pool of workers on the plurality of nodes, wherein each node comprises one or more workers from the second pool; providing a second set of instructions to the second pool of workers for performing a second task configured to interact with the computer system; and activating the second pool of workers to perform the second task. The first task and the second task may be performed in parallel. Alternatively or additionally, the method can include: assigning an exclusivity label to each of the first and second tasks, wherein the exclusivity label is configured to control an order of execution of the first and second tasks, and wherein when the second task has an identical exclusivity label to the first task, the second task is performed serially after the first task is completed.

In another aspect, the subject matter described herein relates to a system. The system includes one or more computer processors programmed to perform operations including: allocating a first pool of workers on a plurality of nodes, wherein each node comprises one or more of the workers from the first pool; providing a first set of instructions to the first pool of workers for performing a first task configured to interact with a computer system; activating the first pool of workers to perform the first task; updating at least a portion of the first set of instructions for a subset of the first pool of workers while the workers are performing the first task; and monitoring at least one performance metric associated with the computer system while the workers from the subset of the first pool are performing the first task.

In certain examples, each node in the plurality of nodes is or includes a virtual machine and/or a physical machine. In some instances, each worker from the first pool resides on a separate node. The plurality of nodes may include at least one director node and at least one worker node. The at least one performance metric may be or include, for example, speed and/or latency. The operations may include providing the at least one performance metric to a client device of a user. The operations may include providing a worker module configured to act as an interface between the first pool of workers and the computer system.

In some examples, the operations can include: allocating a second pool of workers on the plurality of nodes, wherein each node comprises one or more workers from the second pool; providing a second set of instructions to the second pool of workers for performing a second task configured to interact with the computer system; and activating the second pool of workers to perform the second task. The first task and the second task may be performed in parallel. Alternatively or additionally, the operations can include: assigning an exclusivity label to each of the first and second tasks, wherein the exclusivity label is configured to control an order of execution of the first and second tasks, and wherein when the second task has an identical exclusivity label to the first task, the second task is performed serially after the first task is completed.

In another aspect, the subject matter described herein relates to a storage device. The storage device has instructions stored thereon that when executed by one or more computer processors cause the computer processors to perform operations including: allocating a first pool of workers on a plurality of nodes, wherein each node comprises one or more of the workers from the first pool; providing a first set of instructions to the first pool of workers for performing a first task configured to interact with a computer system; activating the first pool of workers to perform the first task; updating at least a portion of the first set of instructions for a subset of the first pool of workers while the workers are performing the first task; and monitoring at least one performance metric associated with the computer system while the workers from the subset of the first pool are performing the first task.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
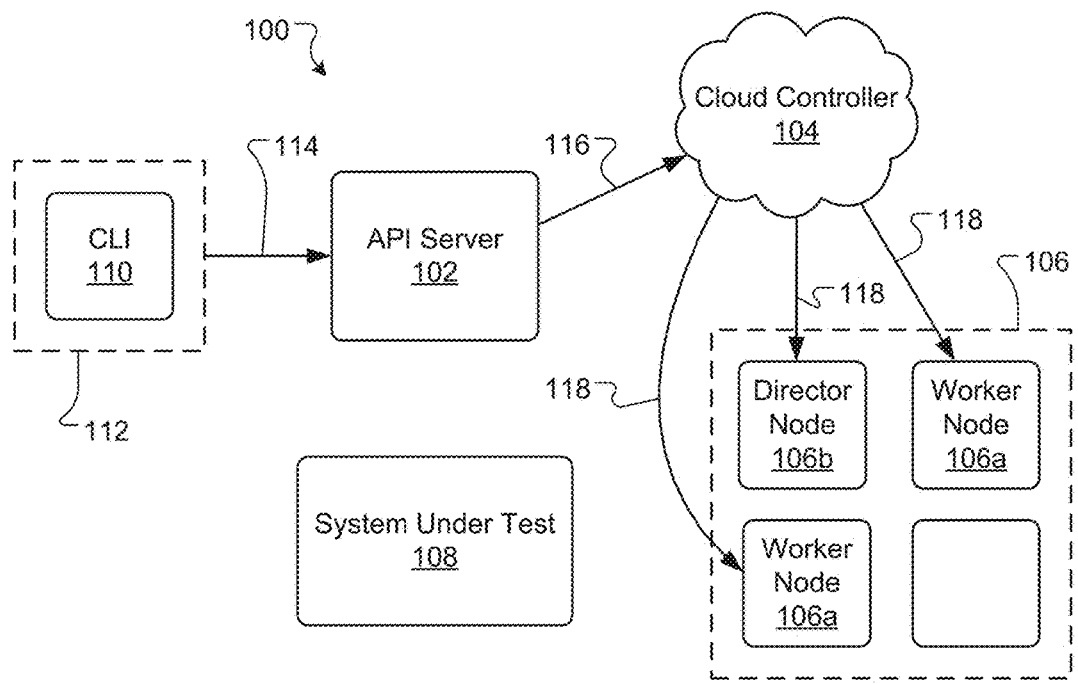
FIGS. 1 and 2 are schematic diagram of an example benchmark system for testing a computer system.

Examples of the subject matter described herein relate to systems and methods for testing a computer system (i.e., a system under test, or SUT). In general, the systems and methods provide easy integration with other programs, computer systems, and/or services using an application programming interface (API). In some instances, the systems and methods are implemented using the ERLANG programming language, although other programming languages may be used, and the systems and methods are not limited to any particular programming language.

The systems and methods are generally configured to determine a number of requests that the SUT can handle. A constant request rate is preferably maintained by the systems and methods, using an open-loop approach. The constant request rate may be maintained regardless of any workload spikes and/or response times associated with the SUT. This constant request rate approach is different from prior approaches (e.g., closed-loop systems) in which the request rate changes according to the SUT response times. With prior closed-loop approaches, when workload spikes are encountered, the number of requests delivered to the SUT decreases. In some examples, however, the systems and methods may use an open-loop approach and/or may not use a constant request rate. For example, a constant request rate may not be guaranteed or achievable. Alternatively or additionally, the closed-loop approach may be desirable and/or utilized for some tests. The systems and methods may be configured to maintain a constant request rate or to allow the request rate to vary (e.g., in a specified manner over time).

The systems and methods are also configured to collect performance metrics associated with the SUT. Such performance metrics provide users of the systems and methods with information related to the performance of the SUT during the test. The performance metrics may include, but are not limited to, a processing speed, a latency, a number of requests, a total message size, a number of errors, a number of responses (e.g., HTTP 200 responses and/or HTTP 500 responses), a number of chat rooms, a number of users, a number of messages per chat room, CPU usage, and/or memory usage. Other performance metrics are possible. Users of the systems and methods are preferably able to specify the types of metrics that are collected during a test. Metric collection instruments used by the systems and methods, such as counters and histograms, can take as little as 2 µs to execute.

In preferred examples, the systems and methods provide users with a command line user interface (CLI) or dashboard. A user may use the CLI to input instructions and parameters associated with the test. The CLI may accept statements or programs written in, for example, an Extensible LISP-like Domain Specific Language (DSL) or other suitable language. Any programs or statements prepared by users are preferably saved and can be reused later, during subsequent testing. The systems and methods are preferably extensible (and scalable) to other programming languages, such as LUA or the like. In some applications, parameters for a test can be set to default values.

FIGS. 1 through 5 are schematic diagrams of an example benchmark system 100 for testing the performance of a computer system or computer-implemented service. Referring to FIG. 1, the benchmark system 100 includes an application programming interface (API) server 102, a cloud controller 104, a plurality of nodes 106, including one or more worker nodes 106a and a director node 106, a system under test (SUT) 108, a command line interface (CLI) 110, and a client device 112. In general, the API server 102 controls the lifecycle of benchmarks (also referred to herein as "tests") performed on the SUT. The API server 102 may be or include, for example, a hypertext transfer protocol (HTTP) server. In one example, the API server 102 is used to start and stop benchmark tests, receive performance metrics (e.g., data logs, charts, or graphs) from the tests, and/or provide the performance metrics to one or more users.

The cloud controller 104 is used to allocate and deallocate worker nodes 106a and director nodes 106b in the plurality of nodes 106. The cloud controller 104 may be, for example, a pluggable module that supports or accesses a cloud service provider, such as, for example, AMAZON WEB SERVICES (AWS) or GOOGLE CLOUD PLATFORM or any other suitable cloud service provider. Each node in the plurality of nodes 106 is a virtual or physical machine used to run the benchmarks and collection and/or process performance metrics. In general, the worker nodes 106a are used to put loads on the SUT and/or to collect performance metrics associated with the SUT during the test. The director node 106b is generally used to merge and/or process performance metrics collected by the worker nodes 106a. In one example, a node in the plurality of nodes 106 is or can include an isolated computing process, such as a docker container developed by Docker, Inc. of San Francisco, Calif.

Advantageously, use of the plurality of nodes 106 makes the benchmark system 100 scalable and able to handle a wide range of requests and connections. In some instances, the benchmark system 100 is capable of handling millions of requests and connections. The plurality of nodes may use up to, for example, 50 nodes, 100 nodes, or more, to achieve the desired scalability.

A user of the benchmark system 100 can interact with the benchmark system 100 using the CLI 110, which is provided on the client device 112. For example, the user can use the CLI 110 to specify various parameters for the benchmark test and/or to access performance metrics from the test. The user may be able to use the CLI 110 to specify or select a desired node type to be used for the test. The CLI 110 may be written in PYTHON or any suitable programming language and/or may be used to make HTTP calls to the API server 102. In other examples, users can interface with the benchmark system 100 using a PYTHON application programming interface (API) or other suitable API, rather than the CLI 110.

In certain implementations, the SUT 108 is the computer system or computer implemented service that is being tested by the benchmark system 100. During the test, the benchmark system 100 puts certain demands or loads on the SUT 108, for example, by asking the SUT 108 to perform various tasks at high rates of speed. As the SUT 108 operates in the loaded condition, the benchmark system 100 monitors the performance of the SUT 108 and collects associated performance metrics. The API server 102 may receive the metrics and forward the metrics to the user for analysis, during or after the test.

In various examples, components of the benchmark system 100 reside on a plurality of computer systems, which may or may not be in the same geographical location. The cloud controller 104 and the API server 102 may be, for example, software components running on the same or different computer systems, which may be located at the same or different geographical locations. Likewise, the plurality of nodes 106 can run on the same or different computer systems located at the same or different geographical locations. In some instances, the plurality of nodes 106 includes two or more nodes residing in two or more data centers, which may be in different geographical locations. Additionally or alternatively, the SUT 108 may be or can include one or more computer systems located at the same or different geographical locations. The geographical location(s) for the SUT 108 and one or more of the plurality of nodes 106 can be the same or different.

When nodes reside in two or more data centers in different parts of the world, there is generally no fast transport between the nodes, and distances between the nodes may be inconsistent or differ. Further, two or more nodes may reside on different private networks, which may make setting up hypercube topology (e.g., each node connected to every other node) difficult and insecure. To address such challenges, certain implementations of the systems and methods utilize a limited protocol (e.g., instead of a full ERLANG remote procedure call) to simplify setup (e.g., star instead of hypercube) and/or to enhance security (e.g., no arbitrary code execution).

Referring to FIG. 1, to initiate a test of the SUT 108 using the benchmark system 100, a user submits a test request using the CLI 110 on the client device 112. The request includes various test parameters and/or instructions and is forwarded from the client device 112 to the API server 102 along a connection 114 (e.g., using HTTP Get). The API server 102 then sends an instruction to the cloud controller 104 along a connection 116 to allocate a number of nodes 106 (e.g., as specified by the user through the CLI 110). A minimum of two nodes 106 may be allocated: at least one node for running the test (i.e., worker nodes 106a) and one node for collecting and/or aggregating performance metrics (i.e., director node 106b). Once the cloud controller 104 has allocated the desired number of nodes using a connection 118, the cloud controller 104 passes control back to the API server 102. For certain cloud service providers, allocating the nodes can involve installing specified images or software and starting up, for example, a secure shell (SSH) server. The API server 102 may interact with the nodes 106 over the SSH server and/or using an SSH protocol.

Figure 2:
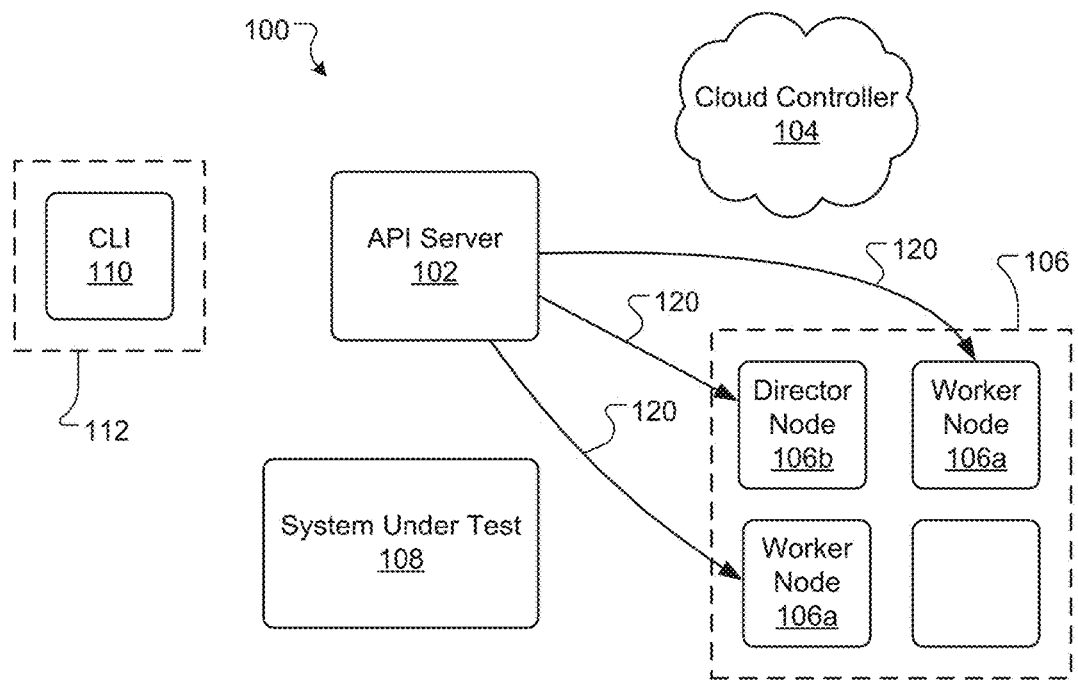
Figure 3:
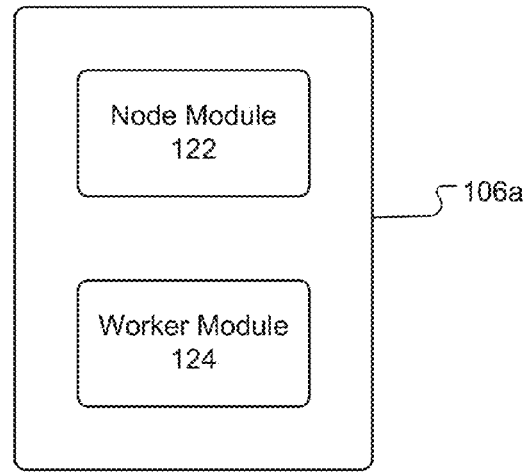
FIG. 3 is a schematic diagram of an example worker node for a benchmark system.

Referring to FIGS. 2 and 3, after the nodes 106 are allocated, the API server 102 may provision or install certain software on the nodes 106. In one example, two software modules are installed along a connection 120. One module can be a node module 122 that controls benchmark execution and metrics collection on each worker node 106a. The node module 122 may also provide an interaction mechanism between each node and the API server 102. The other module can be a worker module 124 (also referred to herein as simply a worker 124) that interacts through the API server 102 with the SUT 108. In general, the worker 124 is provided with instructions to perform one or more tasks or steps during the test, which put a load on the SUT 108. Alternatively or additionally, the worker 124 is configured to collect performance metrics during the test. After installing the software, one or more checks may be performed (e.g., based on Network Timing Protocol (NTP)) to confirm the allocated nodes 106 are operating properly and in a healthy state.

Figure 4:
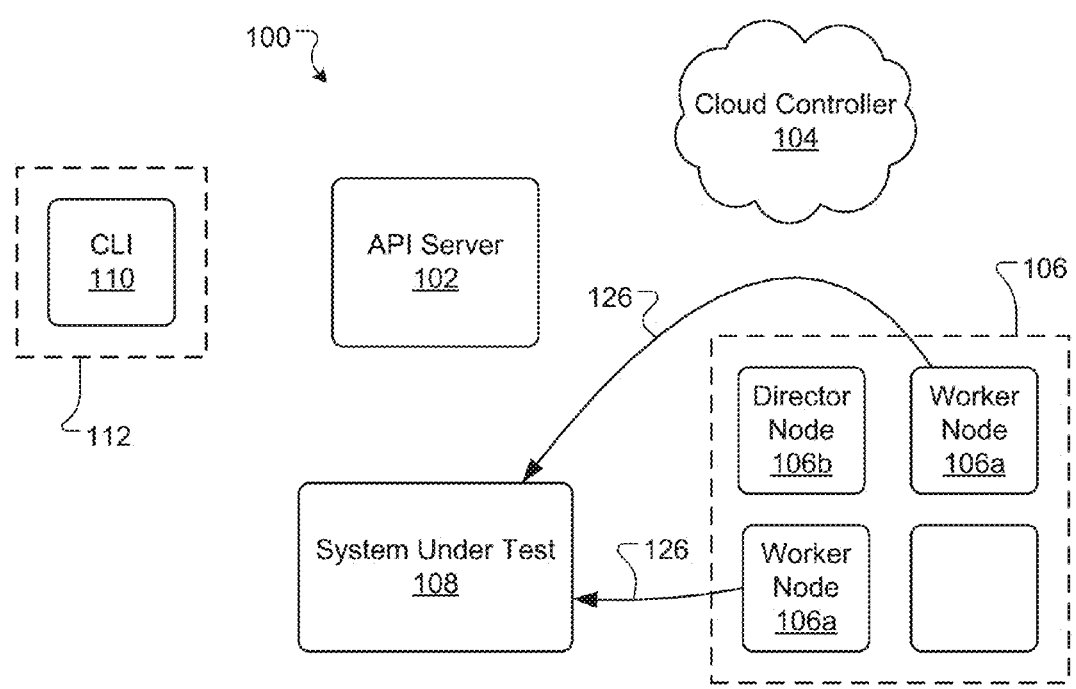
FIGS. 4-6 are schematic diagrams of the example benchmark system of FIG. 1.

Referring to FIG. 4, once the nodes 106 are allocated and provisioned with the desired software, the API server 102 starts the benchmarking test by activating the workers residing on the worker nodes 106a. In general, the workers execute a test plan or scenario that includes one or more tasks and introduces a load on the SUT 108. The scenario may include, for example, a series of requests 126 for the SUT 108 to do something, such as execute a process (e.g., a search), retrieve information, and/or send information. Other requests are possible. As the load is generated in the SUT 108, the workers also collect and/or monitor metrics associated with the performance of the SUT 108 during the test. In the depicted example, three nodes have been allocated: two worker nodes 106a for running the benchmarks and one director node 106b for processing the metrics collected by the worker nodes 106a.

The scenario to be executed by the workers may, in general, be related to the overall purpose or goal of the SUT 108. For example, if the SUT 108 is designed to perform searches and send search results, the scenario may involve having the workers send instructions to the SUT 108 to perform a search (e.g., in a database or over the Internet) and provide the search results. Likewise, if the SUT 108 is designed to retrieve and distribute messages, the scenario may involve having the workers send messages to the SUT 108 and distribute the messages to one or more receivers. For purposes of illustration and not limitation, examples of possible requests the workers may submit to the SUT 108 include, for example, a search request, a print request, a read request, a compute request, a create chat room request, and/or a send message request (e.g., a chat message for a chat room). The type of request generally depends on the SUT 108. For a chat system SUT 108, for example, the workers may send requests specific to chat systems, such as requests to create chat rooms, add a contact to a list, remove a contact from a list, send private messages or ordinary messages, and/or send a broadcast message. For a game system, example requests include requests made by players of a game, such as build something, attack, move, etc. For message brokers, example requests include subscribe to a message queue, unsubscribe from a message queue, send a message to a queue, receive a message from a queue, etc. In general, the user has control over the instructions executed by the workers to perform the scenario. The instructions may include a desired load generation rate and/or intensity, and any desired performance metrics to be collected. The user may implement the instructions through the CLI 110 and/or through a dashboard on the client device 112.

In general, to create a scenario in the benchmark system 100, a pool of workers is established. The workers in the pool do similar tasks since they reference the same worker module, which includes or defines task instructions. A size parameter is specified that defines the number of workers to be included in the pool. In general, each worker in the pool executes an operation defined within the pool. If the scenario runs on more than one node, the workers may be distributed in a round robin or other suitable fashion. The benchmark system 100 preferably has the ability to ramp up the number of workers over some period of time using a ramp function.

In various instances, the benchmark system 100 uses more than one pool, and the multiple pools can be bound to different workers. For example, one pool could be executing HTTP Requests and the other could be executing MQ requests. This is very useful in describing complex scenarios, and it allows each worker pool to work independently of other pools.

In various implementations, tasks performed by workers may be configured to change over time. For example, a rate at which workers send requests to the SUT 108 may be programmed to vary over time, for example, in a linear, quadratic, Poisson, step-wise, or other suitable manner. Likewise, workers may be instructed to change the type(s) of task they perform as a test proceeds. A worker may change, for example, from requesting the SUT 108 to perform a search function to requesting the SUT 108 to perform a print function.

Figure 5:
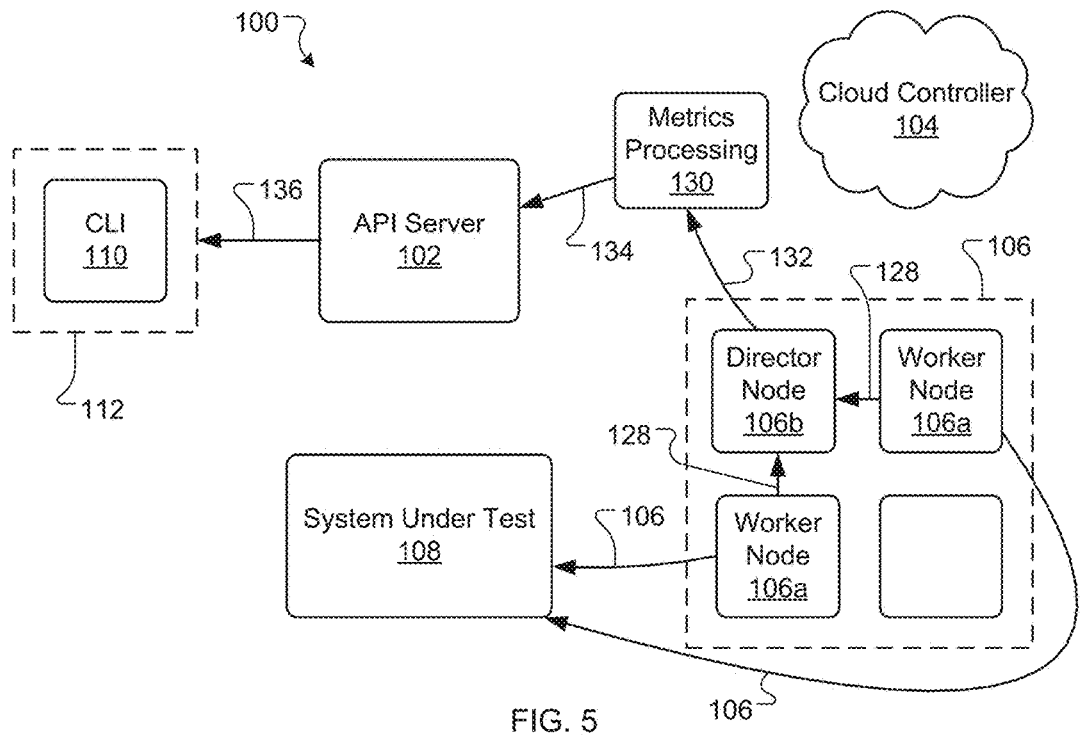

Referring to FIG. 5, while the test is being executed, the worker nodes 106*a* collect certain performance metrics and send the performance metrics (e.g., every second, every 10 seconds, or other suitable time period) to the director node 106*b* along a connection 128. The director node 106*b* then compiles or merges the metrics and sends the merged metrics to a metrics processing module 130 along a connection 132. The metrics processing module 130 may record data logs from the test and/or may generate various plots, charts, and/or tables of the test results. For example, the metrics processing module 130 may generate time histories of speed (e.g., a request or response rate) or latency associated with the SUT 108. Latency may be measured, for example, by determining a difference between a first timestamp (e.g., before a request is started or when a request is sent) and a second timestamp (e.g., after the request is completed or when a response to the request is received). The API server 102 may extract test results, including data logs, plots, charts, and/or tables, from the metrics processing module 130 along a connection 134. The test results may be forwarded to the client device 112 along a connection 136. The user may view the results during the test (e.g., in real-time) and/or once the test is completed. In certain examples, the API server 102 forwards a report of the test results to one or more users by email.

In general, a benchmarking test proceeds until a desired stop time for the scenario is reached. In some instances, however, a test may be terminated early, for example, due to poor performance or failure of the SUT 108 during the test. Early termination of the test may be implemented manually by the user and/or automatically by the benchmark system 100.

Figure 6:
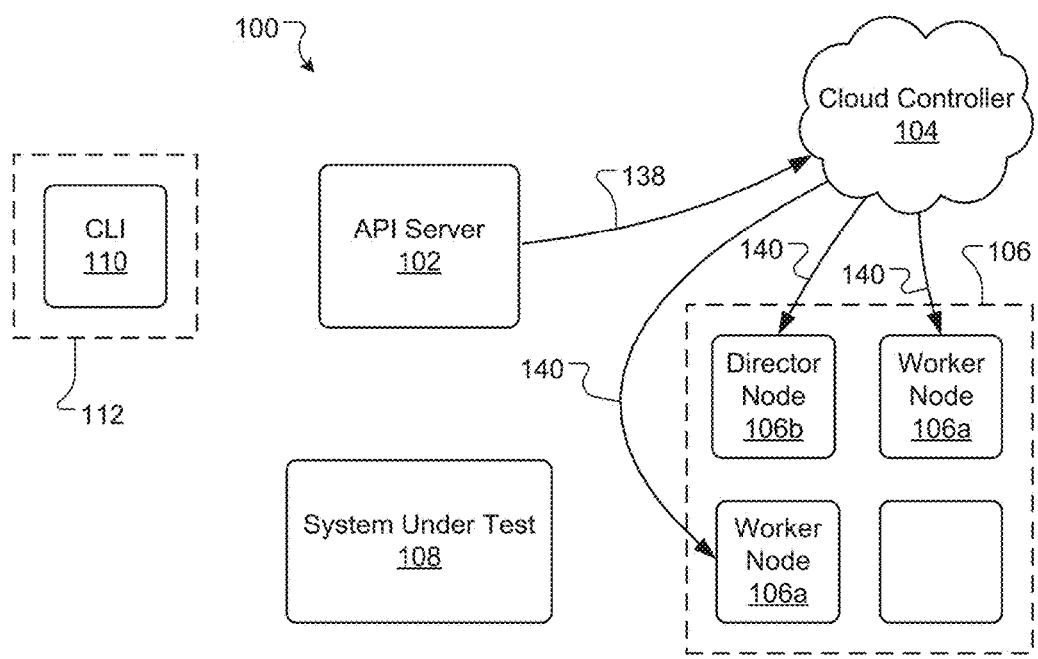

Referring to FIG. 6, after the test is completed, the API server 102 may send an instruction to the cloud controller 104 along a connection 138 to de-allocate the nodes 106 used for the test. The cloud controller 104 may then de-allocate the nodes 106 and/or uninstall any software modules installed on the nodes 106 (e.g., the node module 122 and the worker module 124) using a connection 140. Alternatively, de-allocating the nodes and/or uninstalling the software may be performed by the API server 102. The de-allocated nodes are free to be used later for other purposes, such as another test performed by the benchmark system 100. In some implementations, software modules are retained on the nodes and not uninstalled. This may enable faster deployments of future tests.

In various implementations, data sent between components of the benchmark system 100 and to or from the SUT 108 can be compressed. For example, data logs and metric data may be compressed for transmission between system components. Such compression may allow more data to be sent without having to allocate additional bandwidth. Any suitable compression technique can be used for compressing such data.

In certain examples, a worker can be a software module (e.g., an ERLANG module) that provides functions for test scenarios. A worker may implement a common protocol like HTTP or XMPP, or a specific routine that is relevant only for a particular test case. A worker may also implement and collect related metrics. The following example language may be used to create a worker module in which "search (State, _Meta, Url, Term)" specifies an API function configured to collect a latency metric in a histogram:

```
module(search_worker).
export([initial_state/0,
    search/4]).
metrics( ) ->
    [ {"latency", histogram}].
initial_state( ) -> "".
search(State, _Meta, Url, Term) ->
    Start = os:timestamp( ),
    search_module:search(Url, Term),
    End = os:timestamp( ),
    mzb_metrics:notify({"latency", histogram},
    timer:now_diff(End, Start)).
    {ok, ""}.
```

In various implementations, a test plan or scenario can be implemented in DSL code or the like. The DSL code may have a LISP-like notation and is preferably based on ERLANG Tuples and Lists. To implement a scenario, the DSL code defines the number of processes (i.e., workers) and specific requests that will be used to generate the load in the benchmark. The following text represents an example scenario implemented using ERLANG lists and tuples.

```
[
    {pool, [{size, {var, "workers", 1}},
        {worker_type, search_worker}],
        [{loop, [{time, {5, min}},
```

-continued

```
      {rate,{10, rps}},
   [{search, "https://google.com/?q=", "erlang"},
    {search, "https://google.com/?q=", "euc"}
   ]}
]].
```

In this example, "size" defines a number of processes used to generate the workload, and "worker_type" specifies a worker module. The "loop" section specifies a rate and running time for the test. Under the depicted scenario, workers are instructed to execute a "search" function twice (sequentially) at a rate of 10 requests per second for 5 minutes. The "search" function references the API function defined in the example worker module, described above.

In various examples, a user develops a test for an SUT by creating a worker module and a test scenario. The user has the option of creating a new worker module, using an existing worker module, or modify an existing worker module, for example. The worker module exposes an API that can be used for the test that may include DSL statements. The test scenario references the worker module and, when executed, calls on an API.

In various implementations, a worker pool is a set of workers or worker modules (e.g., ERLANG processes) performing the same or different tasks. The workers can be distributed across worker nodes and can execute one or more tasks simultaneously, as defined in a test plan or scenario. The worker pool can dynamically increase or decrease the number or processes, such that a number of workers can change during a test. The number and types of tasks can also change during the test, according to the instructions from the user.

In some instances, a test utilizes multiple pools of workers, with each pool performing a different set of tasks. For example, one pool may make one type of request for the SUT (e.g., a search request) while the other pool may make a different type of request (e.g., a read request). The multiple pools of workers may reside on different worker nodes or on the same node(s). For example, a worker node may include one or more workers from multiple pools. Workers from the different pools may be used to introduce different types of load on the SUT, at the same or different times. Multiple worker pools can be referenced to one or more different worker modules, e.g., a HTTP pool and/or a message queuing pool.

In various implementations, load created by workers may be implemented using a synchronous loop and/or an asynchronous loop. A synchronous loop can specify, for example, a load type, time, ramp (e.g., linear or Poisson), operation type, and can be nested. An asynchronous loop can include multiple processes and can be configured to maintain a certain request rate. The text below creates an example loop that sends HTTP GET requests for 30 seconds with a growing rate of 1→5 rps.

```
{loop, [
         {time, {30, sec}},
         {rate, {ramp, linear, {1, rps}, {5, rps}}}
       ],
       [
         {get, "http://example.com"}
       ]
}.
```

Loop functions are may be used to generate load by repeatedly executing specified operations in a loop. When adding a loop to DSL, a user can specify, for example, a time for which the loop will run, a rate at which the operations will be executed, whether the rate will be ramped up using, for example, a linear, Poisson, or other distribution, and what operations are executed from inside the loop. All operations may be executed in sequence.

When a benchmark is executed, the systems and methods measure the time required to execute the operations and maintain the requested rate. If the request is smaller than what is achievable, the processes executing the loop may sleep for a remaining duration. To improve performance of the loop, the systems and methods may perform batching of the operations to maintain the rate.

If the response time is high and the systems and methods are unable to maintain the rate, an asynchronous loop may be used in which each iteration is executed by multiple process, using "parallel" or "spawn" operators. The systems and methods may try to guarantee the request rate specified in the loop.

In various implementations, the systems and methods described herein provide fast, precise and scalable result metrics. The metrics may be collected by worker nodes and/or stored on worker nodes or director nodes using, for example, an ERLANG table storage system (ETS) or the like, which may provide hash-based data storage and access functions. The result metrics may include, for example, counters, histograms, and/or other suitable result metrics, and may be aggregated on the director node. A counter can be cumulative and aggregated using a monitoring or aggregation tool, such as, for example, EXOMETER. The counter can use special functions to generate values each second, with 1-2 µs latency. A histogram can be aggregated on the director node using a histogram tool, such as, for example, HDRHISTOGRAM, with 1-2 µs latency. For purposes of illustration and not limitation, certain implementations may use language such as the following for the purpose of naming metrics, grouping metrics, and/or specifying measurement units for metrics:

```
metrics( ) -> [{group, "Application Metrics", [
       {graph, #{ title => "Dummy counter",
              units => "budger",
              metrics => [{"dummy_counter", counter}]}}
    ]}].
```

Figure 7:
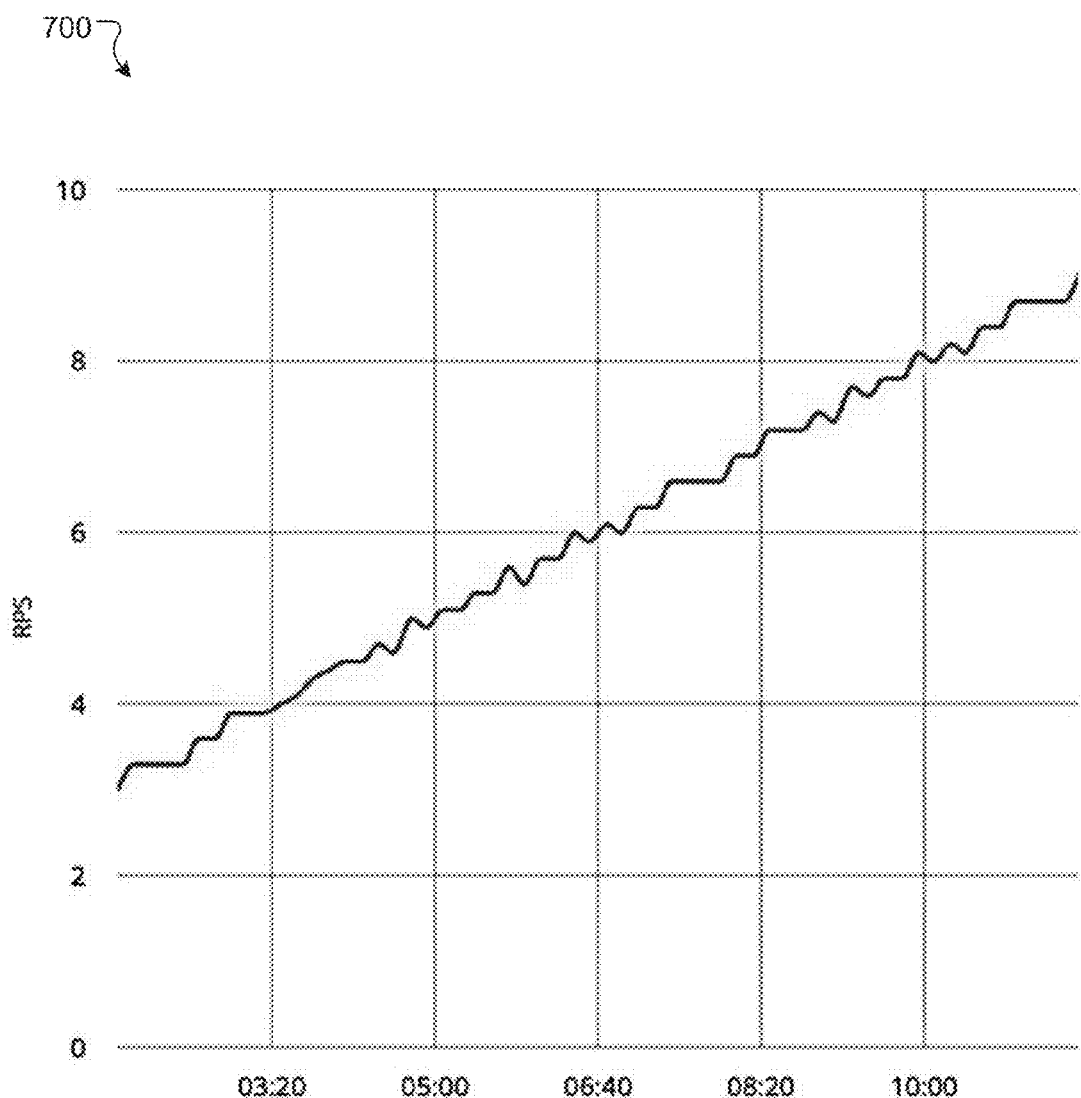
FIG. 7 is an example plot of request rate versus time for a test of a computer system.
Figure 8:
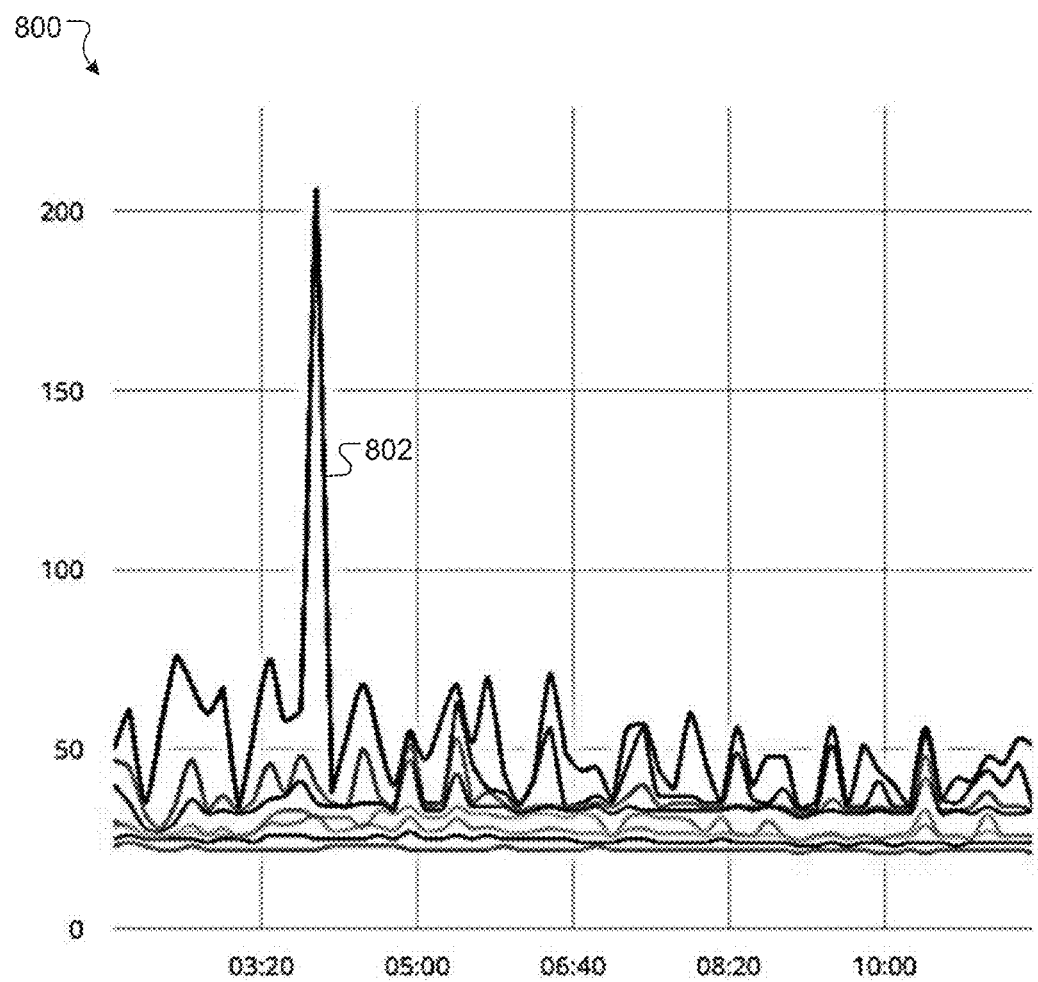
FIG. 8 is an example plot of latency versus time for a test of a computer system.

FIGS. 7 and 8 are example plots of performance metrics from a test of a computer system. FIG. 7 is a plot 700 of request rate (in requests per second) versus time for a worker during the test. As indicated, the request rate increased over time during the test, in an approximately linear manner. FIG. 8 is a plot 800 of latency versus time during the test. Each line in FIG. 8 corresponds to a certain percentage of requests having a latency that falls below the line. A top line 802 is 100% or maximum latency (i.e., all latency values fall below the top line), and the next lines below the top line are 99.9%, 99%, 95%, etc.

Figure 9:
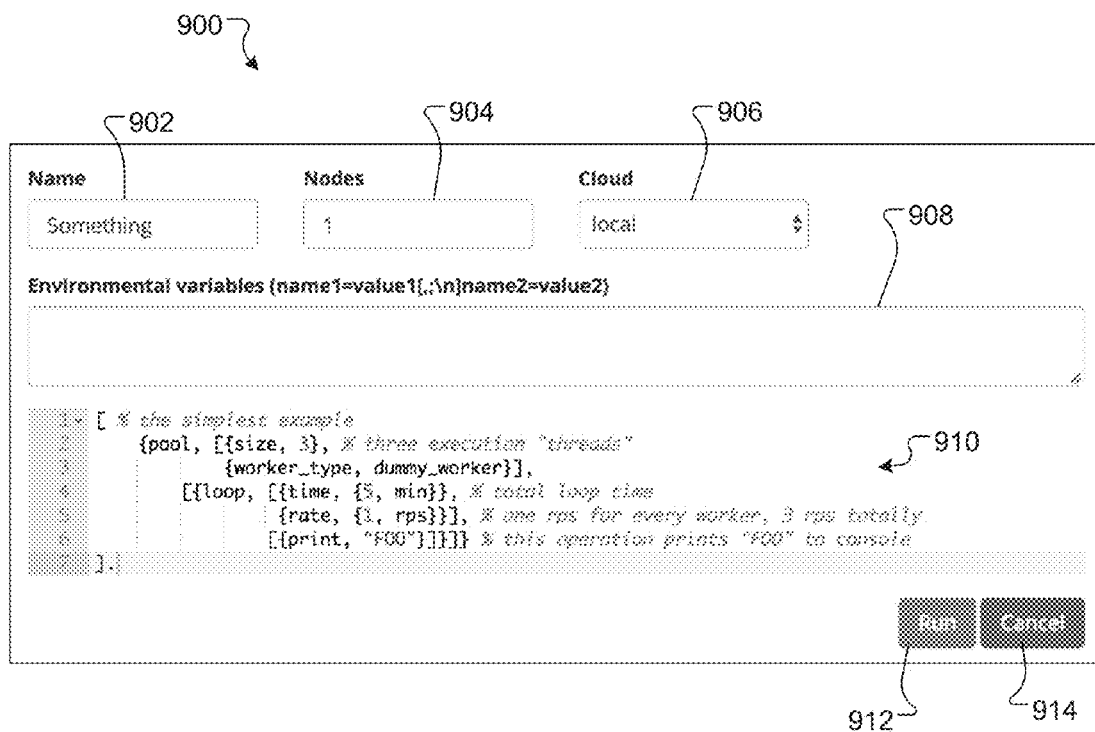
FIG. 9 is a screenshot of a dashboard for a benchmark system.

FIG. 9 is a screenshot of an example dashboard 900 for the systems and methods described herein. A user may use the dashboard 900 to configure, execute, and analyze a test on a SUT. The dashboard includes a name field 902 where a user can enter a name or alias (e.g., a set of strings) to identify or differentiate the test. A nodes field 904 is used to specify a number of worker nodes for the test (e.g., from a cloud provider). A cloud field 906 is used to specify a cloud service provider (e.g., AWS). The cloud field 906 may include a dropdown list of possible cloud service providers, as specified by an API server. An environmental variables field 908 allows the user to specify certain values to be substituted into or added to a script for the test. A script area 910 contains a script body (e.g., instructions for a pool of workers) for the test. The dashboard 900 can be configured to notify the user of unused variables and other errors in the script body before a test is started. A user may start a test by selecting a run button 912 or cancel a test by selecting a cancel button 914.

Figure 10:
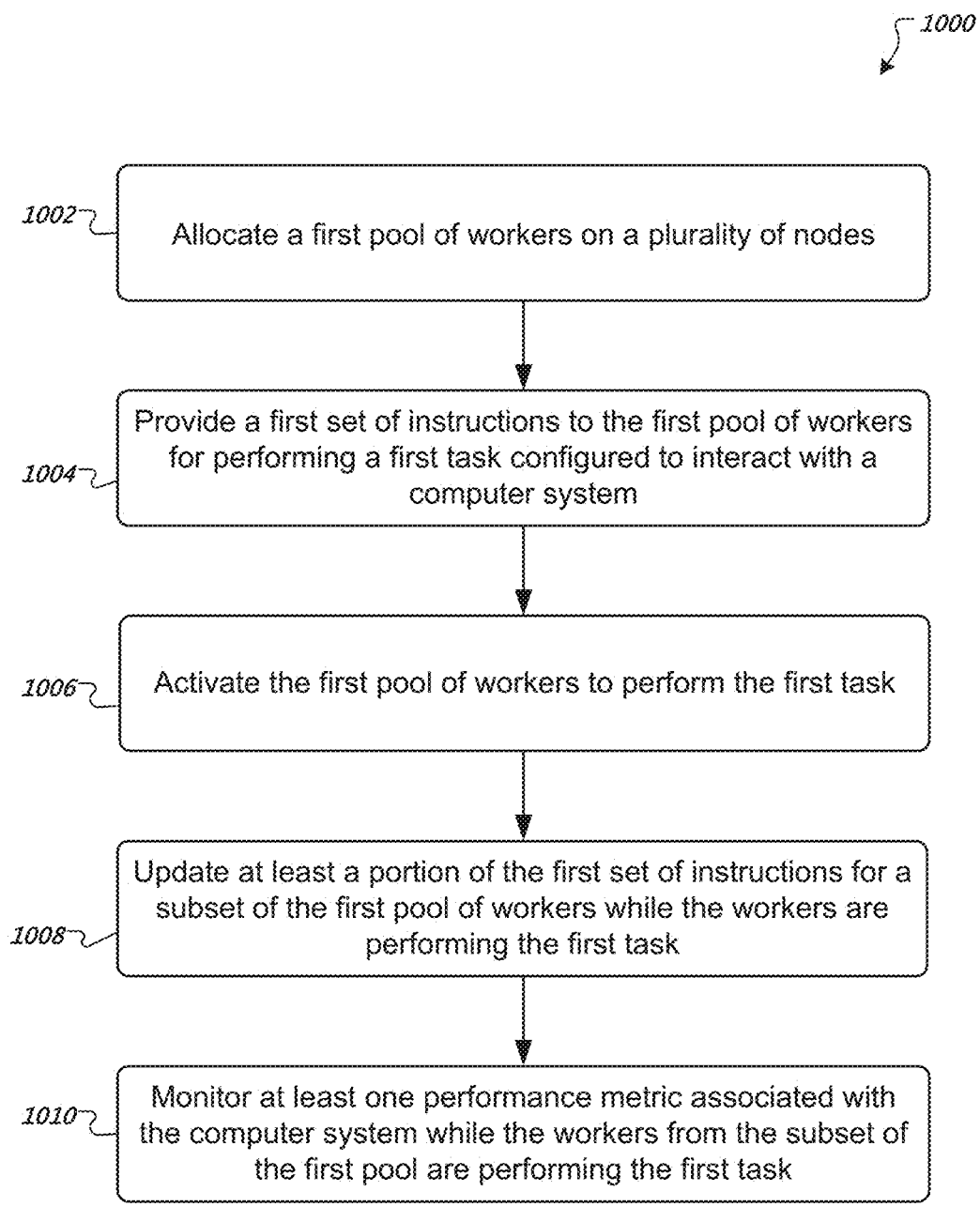
FIG. 10 is a flow diagram of an example method of testing a computer system.

FIG. 10 is a flow diagram of an example method 1000 of testing a computer system. The method includes allocating (step 1002) a first pool of workers on a plurality of nodes. Each node can include one or more of the workers from the first pool. A first set of instructions is provided (step 1004) to the first pool of workers for performing a first task configured to interact with a computer system. The first pool of workers is activated (step 1006) to perform the first task. At least a portion of the first set of instructions for a subset of the first pool of workers is updated (step 1008) while the workers are performing the first task. At least one performance metric associated with the computer system is monitored (step 1010) while the workers from the subset of the first pool are performing the first task.

In various examples, a worker or worker module can be an ERLANG application that includes a set of DSL statements. A worker module can be created using command line utilities. For example, a new worker can be generated using the following command:

<MZ_BENCH_SRC>/bin/mz-bench new_worker <worker_name> where <MZ_BENCH_SRC> refers to a path to system source code. Such a command creates a new directory <worker_name> containing a minimalistic, but fully functional, worker named <worker_name>. In the directory are src/<worker_name>.erl containing the worker source code and examples/<worker_name>.erl containing a simple scenario using it.

When the SUT access is based on a known protocol, such as TCP, the new_worker command can generate a worker already containing code for this type of SUT. The benchmark system includes a list of available protocols that are listed by executing:

<MZ_BENCH_SRC>/bin/mz-bench list_templates.

A new worker can be generated for a particular protocol <protocol> by adding an additional parameter to the new_worker command using the --template option, as follows:

<MZ_BENCH_SRC>/bin/mz-bench new_worker --template <protocol> <worker_name>.

In some examples, a worker module is tested by launching a local instance of a benchmarking scenario using the worker module. For instance, inside a worker source code directory, a user may execute the following command, while replacing <script> with the path to the benchmarking scenario to be run:

<MZ_BENCH_SRC>/bin/mz-bench run_local <script>

The environment variables can be passed using an --env option. All make_install top-level statements may be ignored in this execution mode.

In general, a worker provides a set of DSL statements (e.g., sub-routines) and a set of metrics. The various sub-routines need not to be independent as the worker can have an internal state. The following is an example set of DSL statements for a worker module:

```
module(dummy_worker).
export([initial_state/0, metric_names/2,
    print/3]).
include("mzb_types.hrl").
type state( ) :: string( ).
spec initial_state( ) -> state( ).
initial_state( ) -> "".
spec metric_names( ) -> [{Name :: string( ), counter|histogram}]
metric_names( ) -> [{"dummy_counter", counter}].
spec print(state( ), meta( ), string( )) -> {nil, state( )}.
print(State, Meta, Text) ->
    mzb_metrics:notify({"dummy_counter", counter}, 1),
    lager:info("Appending ~p, Meta: ~p~n", [Text, Meta]),
    {nil, State ++ Text}.
```

This example exports three functions: initial_state/0, metric_names/2 and print/3. The first two of these functions can be required for a worker module.

The initial_state/0 function can return anything and is used to initialize the worker initial state. Each parallel execution job can have its own state, so this function may be called once per job start. If the worker is stateless, an empty string of characters can be used as the state.

The metric_names/2 function may be required in some instances. This function returns a list of metrics generated by the worker.

The remaining exported functions define the DSL statements provided by this worker. The dummy_worker, defined above, provides a print statement useful to output a string of characters to standard output.

In some examples, to define a DSL statement provided by a worker, a user can export an ERLANG function that will be called when such a statement is encountered. The exported function may be of the following general form:

<statement_name>(State, [<Param1>, [<Param 2>, . . . ]])→

{ReturnValue, NewState}.

The function can have the same name as the statement it defines and may take at least the following parameter: the worker internal state at the moment the statement is executed. The function can also accept any number of other parameters, which may correspond to the parameters of the statement.

In various implementations, the statement function can return a tuple of two values. The first member of the tuple is a return value of statement. The statement returns NIL if the statement has no return value. The second member of the tuple is the new worker initial state after the statement execution. For example, the following function can be called as {foo, X, Y} for a benchmarking scenario:

foo(State, X, Y)→

{nil, State}.

In certain examples, performance metrics can be numerical values collected during a scenario execution. Metrics are the main result of a worker and represent the values a user wants to receive and evaluate with a benchmark.

The systems and methods described herein can support several type of metrics, which may include, for example, a counter, a gauge, a histogram, and a derived metric. In general, a counter is a single additive value; new values can be added to the current value. A gauge is preferably a single, non-additive value; a new value replaces the previous value. A histogram may be a set of numerical values that quantify a distribution of values; new values are added to the distribution. A derived metric is evaluated periodically using a user-defined function and/or based on another metric values. For example, a user may instruct the system to compute a metric that is a function of other performance metrics, such as speed and/or latency. For example, if a load includes TCP packets of various sizes and a goal is to track an overall amount of data being transferred, the counter metric can be used. If the goal is to obtain a distribution (e.g., mean size or 50th percentile), a histogram can be used. Other types of metrics are possible.

Metrics collected by a worker may be declared in a list returned by the metric_names/2 function. Each metric may correspond to a tuple of the form:

{"<metric_name>", <metric_type>} where <metric_name> is a name given to the metric, and <metric_type> can be a counter or histogram.

Related metrics can be identified in certain instances. This can be useful to plot certain metric values on the same chart for comparison, for example, success and failure rate counters. Grouped metric declarations can be placed in a sub-list inside a main metrics list. For instance, in the following metrics declaration, Metric_names( )→[[{"success_requests", counter}, {"failed_requests", counter}], {"latency", histogram}], a group of metrics containing success_requests and failed_requests counters is created. Here, one group can be used to produce several graphs. For instance, a group with success and failed requests can produce a graph of absolute counter values and a graph of rate values.

In some instances, a declared metric can be updated from inside a worker, for example, by calling the following function:

mzb_metrics:notify({"<metric_name>", <metric_type>}, <value>).

The tuple {"<metric_name>", <metric_type>} is the same that was used during the metric declaration and identifies the metric to update. The <value> is the value to be added to the metric.

DSL language may be used to write testing scenarios for the systems and methods described herein. In general, the language may have a notation similar to a LISP programming language and may contain lists and tuples. A list is a comma-separated list of items enclosed in brackets, such as, for example: [A, B, C]. A tuple is a comma-separated list of items enclosed in braces, such as, for example: {A, B, C}.

In certain examples, a scenario can be a list of top-level sentences and a dot. For example:

```
[
    Sentence1,
    Sentence2
].
```

Each sentence in this example can be a tuple. The first element of the tuple may indicate a name of a function to call, for example, pool or assert or the like. The other elements may be the parameters to pass to this function. The parameters can be atoms, tuples or lists, such as, for example: {print, "Hello, world!"} or {add, 2, 3}.

In some instances, top-level sentences are sentences that can appear in a top-level list describing the scenario. Top-level sentences can be one of two kinds: top-level directives and pools. Top-level directives tell the system about certain general facts related to the scenario or define certain global parameters. Pools describe the actual work to be performed. Examples of top-level directives are as follows: {make_install, [{git, <URL>}, {branch, <Branch>}, {dir, <Dir>}]}. This examples instructs the system to install software from a remote git repository on the working nodes before executing the scenario. For instance, it performs the following actions:

git clone <URL> temp_dir
cd temp_dir
git checkout <Branch>
cd <Dir>
sudo make install.

In this example, if no branch is specified, a master can be used instead.

Additional directives may be provided. For example, the following example directive instructs the benchmark system to include additional resource files in a scenario: {include_resource, handle, "filename.txt"}. The following example directive instructs the benchmark system to check that a specified condition is satisfied all the time while the scenario is running: {assert, always, <Condition>}. The following example directive instructs the benchmark system to check that the condition is satisfied at least for the amount of time specified: {assert, <TimeConstant>, <Condition>}. A condition can be specified such that a certain metric can satisfy a numerical limit. For instance, a condition can be that latency is less than 30 milliseconds. Other directives are possible.

In certain instances, the pool directive represents a pool of jobs to be distributed among the nodes and to be done in parallel, and a job is a set of instructions defined or executed by a worker. A worker may be or include a plugin that defines a set of instructions to access a particular service (e.g., an HTTP server, an FTP server, or TWITTER). The following is an example pool that sends HTTP GET requests to two sites on 10 nodes in parallel:

```
[ {pool,
  [ {size, 10}, {worker_type, simple_http_worker} ],
  [
    {get, "http://example.com"},
    {get, "http://foobar.com"}
  ]
} ].
```

The get statement is provided by a built-in simple_http worker. The first parameter in the pool statement is a list of pool options.

In general, a pool may be defined using a pool top-level statement, as follows:

```
{pool,
  [
    <PoolOption1>,
    <PoolOption2>,
    ...
  ],
  [
    <Statement1>,
    <Statement2>,
    ...
  ]
}
```

The pool top-level statement can take two arguments, including a list of options and a list of statements. The list of pool options may define, for example, how many jobs will be launched in parallel, which worker to use to define a list of allowed statements, and how the jobs can be launched. Size and worker_type may be required. The list of statements defines the job. A user can use the statements defined by the selected worker and the statements of the standard library. For example, the pool top-level statement may be:

```
[{pool, [{size, 10},
        {worker_type, dummy_worker}],
    [ {print, "AAA"} ]
},
{pool, [{size, 5},
        {worker_type, dummy_worker}],
    [ {print, "BBB"} ]
}].
```

This example includes two pools and defines two separate jobs. The job defined by the first pool will be launched 10 times in parallel as defined by the size option and will be described using the set of statements defined by the dummy_worker. The job defines only one statement (i.e., print) and involves printing a string of characters to standard output. Because nothing else is specified, all the jobs will be launched at the same time. The job associated with this pool can include a single statement: {print, "AAA"}. When started, the job will print the string of characters AAA to the standard output, and then terminate. The job for the second pool is defined using the dummy_worker and involves printing BBB and then terminating. The job will be launched 5 times in parallel and at the same time. In sum, the above example script defines two jobs that involve printing AAA 10 times and printing BBB 5 times, all in parallel. If the script is run on 3 nodes, the 15 strings can be evenly distributed between all 3 nodes.

Various options for pools may be defined. For example, the following option instructs the benchmark system on how many jobs must be launched: {size, <int>}. The number may be any integer.

The following option identifies the worker that defines the set of instructions to write a particular job: {worker_type, <Atom>}. In general, a pool includes only one type of worker. If more than one type of worker is to be used, more than one pool may be defined, such that each worker type is associated with a separate pool.

The following option indicates to the system that parallel jobs must be started with a constant delay between them: {worker_start, {linear, <rate>}}. The <rate> indicates how many jobs must be started per second. If not specified, all the jobs are started at the same time. The rate at which jobs are performed can be defined to change over time, for example, in a linear or quadratic fashion.

The following option indicates to the system that the jobs can be started at a rate defined by a Poisson process: {worker_start, {poisson, <rate>}}. If not specified, all the jobs may start at the same time.

In some examples, statements may take a Boolean condition as an argument. Such a condition may be defined by a triplet, in which the first element is an atom that defines the used comparison operation. The operations can include, for example: lt (less than); gt (greater than); lte (less than or equal to); and gte (greater than or equal to). Other operations are possible. The second and third elements are the two values to compare. Each value can be either a number (e.g., an integer or a floating point value) or a metric name. Metrics are numerical values collected during the benchmarking and may be defined by the worker. For example, if dummy_worker is used, the following condition can be used: {gt, "print.value", 20}. The condition will succeed if the print operation was performed more than 20 times.

Alternatively or additionally, the systems and method described herein may use various loops. A loop statement instructs the benchmark system to repeat some block of statements several times. This enables generating different load profiles. In a general form, the loop statement can be defined as follow:

```
{loop, [
    {time, <time>},
    {rate, <rate>},
    {parallel, <N>},
    {iterator, <name>}
],
[
    <Statement1>,
    <Statement2>,
    ...
]
}
```

The loop statement can take two parameters: a list of options and a list of statements. A list of statements defines the actual job to be repeated and can contain any worker or standard library defined statements. The list of options defines how to repeat this job.

For example, the following option specifies how long a block of instructions is repeated: {time, <time>}. The <time> can be specified, for example, as follows: {N, h}—repeat for N hours; {N, min}—repeat for N minutes; {N, sec}—repeat for N seconds; {N, ms}—repeat for N milliseconds.

The following option specifies how often the block of instructions is repeated: {rate, <rate>}. The <rate> can be specified as follows: {N, rph}—repeat N times per hour; {N, rpm}—repeat N times per minute; {N, rps}—repeat N times per second; {ramp, linear, <start-rate>, <end-rate>}—linearly change the repeating rate from <start-rate> to <end-rate>. If no rate is specified, the block of instructions may be repeated as often as possible.

The following option indicates that iterations are executed in <N> parallel threads: {parallel, <N>}. If not specified, the iterations can be performed one by one.

The following option defines a variable named <name> inside the repeated block of instructions that contain the current iteration number: {iterator, <name>}. It can be accessed with the following instruction: {var, <name>}.

In the following example, the loop body execution rate will grow continuously from 1 rps to 5 rps during five seconds.

```
{loop, [
    {time, {5, sec}},
    {rate, {ramp, linear, {60, rpm}, {5, rps}}}
],
[
    {print, "E!"}
]
}
```

In the following example, a nested loop is used with a repeat rate defined using a variable.

```
{loop, [
    {time, {5, sec}},
    {rate, {1, rps}},
    {iterator, "i"}
],
[
    {loop, [
```

```
                {time, {1, sec}},
                {rate, {{var, "i"}, rps}}
            ],
            [
                {print, "E!"}
            ]
        }
    ]
}
```

The difference between the previous two examples is in the way the rate grows. The first example likely yields a straight line chart; the second example likely yields a step-function chart.

In various examples, the benchmarking scenarios often need to contain some number of values, such as, for example, speed of execution or the overall duration. This can be done using environment variables. Environment variables are global variables that can be accessed at any point of the scenario. For example, the following replaces hardcoded values by a variable statement of the form: {var, <name>[, <default_value>]}, where <name> is a string of characters identifying the value. The actual values can then be passed when the scenario is launched using the --env command line parameter.

In addition to launch time, the values passed to the scenario as environment variables can be defined or updated while the scenario is running. In particular, a change_env command can be used to define or redefine one or more environment variables without interrupting the scenario. For example, an environment variable can be specified or updated using the following command while the scenario is running:

<MZ_BENCH_SRC>/bin/mz-bench change_env <benchmark_id> --env <name=value>

The parameter <benchmark_id> comprises the unique identification number of the scenario. The parameter <name=value> comprises the name and value of the environment variable to be defined or changed. One or more environment variables can be defined or updated in such a manner while the scenario is running. Once the command is entered, a successful response can be comprised of, for example, a JSON (JavaScript Object Notation) object with a "status" field of "set," for instance, as follows: {"status": "set" }.

It is noted that the scenario does not pause, stop or otherwise halt when the environment variables are added or updated using the change_env command. Rather, ERLANG code reload or other suitable "hot" code replacement functionality can be used to implement such a change_env command. For example, with ERLANG code reload, the code corresponding to the environment variable(s) can be replaced with the new or updated environment variable(s), such that when an ERLANG virtual machine is switching its state after executing a function, the new code with the new/updated environment variable(s) can be applied.

Alternatively or additionally, commands can be sent to a specified percentage of workers using the -- percent option. For purposes of illustration and not limitation, 1000 HTTP clients can be started, with each running a GET request every second. After a period of time (e.g., one second), a command can be given through the command line interface (e.g., CLI 110) to, for example, 10% of the workers to reconnect, as follows:

<MZ_BENCH_SRC>/bin/mz-bench run_command <benchmark_id> --percent 10 --pool 1 reconnect( )

The parameter <benchmark_id> comprises the unique identification number of the scenario. The -- percent option specifies the percentage of workers that will receive the command. The specified percentage of workers can be chosen randomly or according to any suitable selection technique or process (e.g., selecting the indicated percentage of workers with the lowest benchmark IDs or other appropriate selection technique). In the present illustration, 10% of workers will receive the command. The --pool option specifies the size of the number of workers to be included in the pool. In the present illustration, the size is specified as one. The command to be executed by the indicated percentage of workers is specified at the end of the command line. Any suitable command can be specified. In the present illustration, the reconnect( ) command is specified. Other commands (such as, for example, wait (1 sec.), which can pause the given percentage of workers for one second) are possible. More particularly, with the --percent option, a command execution message can be sent to the given percentage of workers. Although all workers can check their respective "mailboxes" or other inbound message buffers at every iteration or interval, only the given percentage of workers will receive the command, which will be executed by those workers after it is received.

To control the order of execution of scenarios, each or any scenario can have an associated "exclusivity" label. An exclusivity label comprises a text string (preferably without commas or spaces). For purposes of illustration and not limitation, "mysystem" can be a valid exclusivity label. Other exclusivity labels are possible. The same exclusivity label can be assigned to one or more scenarios. With such exclusivity labels, one scenario for each label is allowed to be executed at any one time, and any further scenarios with the same label will be blocked from execution until the previous scenario has finished. Therefore, the exclusivity labels can be used to control the order of execution of a set of scenarios. Any suitable order of execution of the scenarios in a set of scenarios is possible. For example, any scenario that is created can have an associated unique benchmark ID that can be generated according to the order of creation of the scenario, such that no two scenarios have identical benchmark IDs. The same exclusivity label can then be associated with a set of scenarios (e.g., scenario 1, scenario 2, . . . , scenario N, where N is any suitable number). For example, the scenario 1 can have the smallest of the benchmark IDs, which can indicate that it was created first, and, therefore, can be executed first. The scenario 2 with the next smallest benchmark ID (indicating that it was created second, after the first scenario) can be executed next, and so forth to scenario N. With such a mechanism, an entire set of scenarios can be started without the need for manually and individually controlling each of them.

In certain instances, a resource statement can be used to include data in a file. A resource file can be declared using the include_resource top-level directive, as follows:

{include_resource, <resource_name>, <file_name>, <type>}, where <resource_name> is an atom that identifies this resource file inside the scenario, and <file_name> is a string of characters providing the file name of the resource file. The <type> parameter is an atom indicating how the content of the file should be interpreted. Once the resource file has been registered, its content can be included at any place inside a scenario using the resource statement: {resource, <resource_name>}.

In certain examples, the systems and methods utilize pre and/or post hooks that allow a user to run custom code before and/or after a benchmark. Hooks can be applied on every node or only on the director node. Any environment variable in a hook handler can be changed and used for a scenario. An example hook for a scenario is as follows:

```
{pre_hook, [
    {exec, all, "yum install zlib"},
    {worker_call, fetch_commit, my_worker}
]}
{pool, [{size, 3}, {worker_type, dummy_worker}], [
    {loop, [{time, {1, sec}},
            {rate, {ramp, linear, {10, rps}, {50, rps}}}],
        [{print, {var, "commit", "default"}}]}]}.
```

An example hook for a worker is as follows:
 fetch_commit(Env)→
  {ok, [{"commit", "0123456"}|Env]}.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    allocating a first pool of workers on a plurality of nodes,
        wherein each node comprises one or more of the workers from the first pool;
    providing a first set of instructions to the first pool of workers for performing a first task configured to interact with a computer system;
    activating the first pool of workers to perform the first task;
    updating at least a portion of the first set of instructions for a subset of the first pool of workers while the workers are performing the first task; and
    monitoring at least one performance metric associated with the computer system while the workers from the subset of the first pool are performing the first task.

2. The method of claim 1, wherein each node in the plurality of nodes comprises at least one of a virtual machine and a physical machine.

3. The method of claim 1, wherein each worker from the first pool resides on a separate node.

4. The method of claim 1, wherein the plurality of nodes comprises at least one director node and at least one worker node.

5. The method of claim 1, wherein the at least one performance metric comprises at least one of speed and latency.

6. The method of claim 1, comprising:
    providing the at least one performance metric to a client device of a user.

7. The method of claim 1, comprising:
    providing a worker module configured to act as an interface between the first pool of workers and the computer system.

8. The method of claim 1, comprising:
    allocating a second pool of workers on the plurality of nodes,
        wherein each node comprises one or more workers from the second pool;
    providing a second set of instructions to the second pool of workers for performing a second task configured to interact with the computer system; and
    activating the second pool of workers to perform the second task.

9. The method of claim 8, wherein the first task and the second task are performed in parallel.

10. The method of claim 8, comprising:
    assigning an exclusivity label to each of the first and second tasks,
        wherein the exclusivity label is configured to control an order of execution of the first and second tasks, and
        wherein when the second task has an identical exclusivity label to the first task, the second task is performed serially after the first task is completed.

11. A system, comprising:
one or more computer processors programmed to perform operations comprising:
allocating a first pool of workers on a plurality of nodes,
wherein each node comprises one or more of the workers from the first pool;
providing a first set of instructions to the first pool of workers for performing a first task configured to interact with a computer system;
activating the first pool of workers to perform the first task;
updating at least a portion of the first set of instructions for a subset of the first pool of workers while the workers are performing the first task; and
monitoring at least one performance metric associated with the computer system while the workers from the subset of the first pool are performing the first task.

12. The system of claim 11, wherein each node in the plurality of nodes comprises at least one of a virtual machine and a physical machine.

13. The system of claim 11, wherein each worker from the first pool resides on a separate node.

14. The system of claim 11, wherein the plurality of nodes comprises at least one director node and at least one worker node.

15. The system of claim 11, wherein the at least one performance metric comprises at least one of speed and latency.

16. The system of claim 11, wherein the operations comprise:
providing the at least one performance metric to a client device of a user.

17. The system of claim 11, wherein the operations comprise:
providing a worker module configured to act as an interface between the first pool of workers and the computer system.

18. The system of claim 11, wherein the operations comprise:
allocating a second pool of workers on the plurality of nodes,
wherein each node comprises one or more workers from the second pool;
providing a second set of instructions to the second pool of workers for performing a second task configured to interact with the computer system; and
activating the second pool of workers to perform the second task.

19. The system of claim 18, wherein the operations comprise:
assigning an exclusivity label to each of the first and second tasks,
wherein the exclusivity label is configured to control an order of execution of the first and second tasks, and
wherein when the second task has an identical exclusivity label to the first task, the second task is performed serially after the first task is completed.

20. An article, comprising:
a non-transitory computer-readable medium having instructions stored thereon that when executed by one or more computer processors cause the computer processors to perform operations comprising:
allocating a first pool of workers on a plurality of nodes,
wherein each node comprises one or more of the workers from the first pool;
providing a first set of instructions to the first pool of workers for performing a first task configured to interact with a computer system;
activating the first pool of workers to perform the first task;
updating at least a portion of the first set of instructions for a subset of the first pool of workers while the workers are performing the first task; and
monitoring at least one performance metric associated with the computer system while the workers from the subset of the first pool are performing the first task.

* * * * *